US009728967B2

(12) United States Patent
Birnbach (10) Patent No.: US 9,728,967 B2
(45) Date of Patent: Aug. 8, 2017

(54) SYSTEM FOR IMPROVING POWER FACTOR IN AN AC POWER SYSTEM (71) Applicant: Curtis A Birnbach, New Rochelle, NY (US)

(72) Inventor: Curtis A Birnbach, New Rochelle, NY (US)

(73) Assignee: Advanced Fusion Systems LLC, Newtown, CT (US)

(*) Notice: Subject to any disclaimer, the term of this patent is extended or adjusted under 35 U.S.C. 154(b) by 161 days.

(21) Appl. No.: 14/223,578

(22) Filed: Mar. 24, 2014

(65) Prior Publication Data
US 2015/0270772 A1   Sep. 24, 2015

(51) Int. Cl.
H02J 3/18   (2006.01)

(52) U.S. Cl.
CPC .......... H02J 3/1828 (2013.01); Y02E 40/30 (2013.01); Y02P 80/112 (2015.11)

(58) Field of Classification Search
CPC ........ H02M 1/12; H02M 1/4216; H02M 1/02; H02M 1/04; H02M 3/08; G05F 1/10
See application file for complete search history.

(56) References Cited

U.S. PATENT DOCUMENTS

| | | | | |
|---|---|---|---|---|
| 2,898,515 A | * | 8/1959 | Rywak | H02M 1/04 315/168 |
| 3,475,702 A | * | 10/1969 | Ainsworth | H02M 1/12 333/17.1 |
| 3,887,781 A | * | 6/1975 | Peters, Jr. | F24C 7/02 219/502 |
| 4,390,826 A | * | 6/1983 | Erdman | D06F 37/304 318/400.17 |
| 4,950,962 A | | 8/1990 | Birnbach et al. | |
| 5,227,962 A | * | 7/1993 | Marsh | H02J 3/1864 323/208 |

(Continued)

OTHER PUBLICATIONS

Service Bulletin SB-15, CONDIS compressed Gas Capacitors (Jun. 10, 1994), Comet AG, http://www.wvs-tech.de/wvs-tech/data/produkte/vakuumkondensatoren/servicebulletins/pdf/sb_15.pdf.

(Continued)

Primary Examiner — Matthew Nguyen
Assistant Examiner — Yusef Ahmed
(74) Attorney, Agent, or Firm — Brunzga & Associates; Charles E. Bruzga (57) ABSTRACT A combination includes an AC power system and a system for improving power factor in the AC power system by continuously variable, analog control of level of reactive current introduced into a power conveying line of the AC power system. A power factor-improving circuit includes at least one channel that comprises a channel-level AC electron tube circuit and at least one associated reactive impedance element interconnected in series manner. Each of the channel-level AC electron tube circuit is responsive to a control system for continuously variable, analog control of the level of reactive current in the at least one associated reactive impedance element so that the foregoing level of reactive current changes, as necessary, in a continuously variable, analog manner to improve power factor in the power conveying line. Each of the channel-level AC electron tube circuit comprises at least one cold-cathode field-emission electron tube.

29 Claims, 5 Drawing Sheets

(56) References Cited

U.S. PATENT DOCUMENTS

| | | | | |
|---|---|---|---|---|
| 5,260,862 A * | 11/1993 | Marsh | H02J 3/1864 | 333/174 |
| 5,719,757 A * | 2/1998 | Beyerlein | H02M 1/4216 | 323/211 |
| 5,844,791 A * | 12/1998 | Swamy | H02J 3/01 | 333/175 |
| 6,008,548 A * | 12/1999 | Fenner | H02J 3/1828 | 307/105 |
| 6,061,256 A * | 5/2000 | Kolar | H02M 1/4216 | 363/17 |
| 6,181,113 B1 * | 1/2001 | Hu | G05F 1/70 | 307/102 |
| 8,300,378 B2 | 10/2012 | Birnbach | | |
| 2007/0281421 A1 | 12/2007 | Cheung | | |
| 2009/0190383 A1 * | 7/2009 | Birnbach | H02M 7/533 | 363/120 |
| 2010/0097734 A1 * | 4/2010 | Birnbach | H01H 83/10 | 361/54 |
| 2010/0195256 A1 * | 8/2010 | Birnbach | H01H 83/10 | 361/56 |
| 2010/0289577 A1 * | 11/2010 | Birnbach | A23L 3/263 | 330/207 R |
| 2010/0327823 A1 * | 12/2010 | Nisenblat | H02J 3/1828 | 323/206 |
| 2011/0096577 A1 * | 4/2011 | Yamada | H02M 7/217 | 363/44 |
| 2012/0081097 A1 * | 4/2012 | Birnbach | G05F 1/10 | 323/304 |
| 2012/0188007 A1 * | 7/2012 | Van Zyl | H01J 37/32183 | 327/574 |
| 2013/0193867 A1 * | 8/2013 | Van Zyl | H01J 37/32183 | 315/240 |
| 2014/0268468 A1 | 9/2014 | Sheng et al. | | |

OTHER PUBLICATIONS

EM132 Multi-Function Transducer (Dec. 2011), SATEC Ltd., http://pdf.directindustry.com/pdf/satec/em132-datasheet/58438-205045.html.

EM133 TOU Energy Meter & Multi-Functional Smart Power Meter (Dec. 2011) (pp. 3 and 5, as downloaded from the cited website, are blank), SATEC Ltd., http://pdf.directindustry.com/pdf/satec/em133-datasheet/58438-205047.html.

EM133 TOU Energy Meter & Multi-Functional Smart Power Meter (May 2013), SATEC Ltd., http://www.satec-global.com/sites/default/files/EM133_Datasheet_May2013.pdf.

International Search Report and Written Opinion of the International Searching Authority, PCT/US2015/017979 (mailed on Jun. 11, 2015), World Intellectual Property Organization.

PE—SCGF—100/50, SF6 Gas Filled Standard Capacitor 100pF / 50kV, Power Electronical, http://www.powerelectronical.com/PDF/HV_Standard_Capacitor_SF6_Gas-filled.pdf (last visited on Oct. 26, 2015).

C192PF8-RPR Power Factor Manager & Reactive Power Regulator: Installation and Operation Manual, BG0347 Rev. A1, SATEC Ltd., http://www.satec-global.com.au/documentation/C192PF8-RPR.pdf (last visited on Oct. 26, 2015).

\* cited by examiner

SYSTEM FOR IMPROVING POWER FACTOR IN AN AC POWER SYSTEM

FIELD OF THE INVENTION

The present invention relates to a system for improving power factor in an AC power system.

BACKGROUND OF THE INVENTION

The following are definitions of various terms as used herein for better understanding of the inventive system for improving power factor in an AC power system:

1) An "AC power system" connotes herein a source of power and an electrical load that is interconnected by at least one power conveying line. An AC power system may provide power to a single building, for instance, or may provide power to many buildings, as in a power distribution system.
2) A "power conveying line" connotes herein a circuit comprising a set of electrical conductors for conveying power between two points and includes, but is not limited to, a power transmission line or a power distribution line. A power conveying line may be included within a power generation facility itself, or may be used for power transmission or distribution, or may be included within a facility of an end-user of power.
3) A "power transmission line" connotes herein an electrical power conveying line that connects one or more electrical sources (e.g., power conveying line, generator, or electrical substation) to one or more electrical loads such as an electrical substation. A power transmission line typically operates near or above 100 kVolts
4) A "power distribution line," as used herein, connects an electrical substation to individual users, often with local voltage step-down transformers, or an end-user load. The end-user load may be within a single industrial or commercial site, such as a steel mill or other manufacturing facility or a school, by way of example, and typically operate near or below 65 kVolts.
5) "Medium voltage" connotes herein approximately the range from 600 Volts to 70 kVolts, in accordance with electrical power industry usage.
6) "High voltage" connotes herein voltages above 70 kVolts, in accordance with electrical power industry usage.
7) "Power Factor" is defined as the cosine of the angular displacement between the electrical kiloWatt vector and kilovVoltAmpere vectors of any AC electrical circuit. Power factor can be represented as the cosine; i.e., 0.8, etc., or as the cosine multiplied by 100 and represented in percent; i.e., 80%, etc. Power Factor can be expressed as a positive or negative number. A positive power factor indicates that the cosine between the kilowatt vector and the kilovoltampere vector is influenced by electrical inductance. A negative power factor indicates the cosine between the kilowatt vector and kilovoltampere vector is influenced by electrical capacitance. The optimum power factor for any AC electrical power system is 1.0, the equivalent of 100%. During a time period when an AC power system operates at a power factor of 100%, all of the delivered energy is in the form of kilowatts.
8) As used herein, "anti-parallel connected" unidirectional cold-cathode field-emission electron tubes refers to a pair of the foregoing type of electron tubes that are connected in anti-parallel or inverse-parallel manner. Thus, the pair of the foregoing type of electron tubes is connected in parallel but with their polarities reversed allowing operation in AC circuits.
9) As used herein, the term "controlled" in relation to control of current level refers to any of (a) grid-controlled conduction as implemented by one or more electron tubes, (b) control terminal-controlled conduction implemented by semiconductor device(s) via one or more control electrodes, or (c) controlled conduction implemented by other device(s) such as saturable reactors that have one or more control elements to control conduction, where, for each of (a)-(c), controlled conduction connotes controlling the level of current through the tube(s) or device(s) in an analog, continuously variable fashion.
10) A "control terminal" as used herein connotes (a) a control electrode of an Insulated Gate Bipolar Transistor (IGBT) or Field-Effect Transistor (FET) or other semiconductor device that regulates current therethrough in a continuously variable manner, or (b) a terminal of a control winding of a saturable reactor. Further, "control terminal" connotes herein a generic term that includes a grid for an electron tube, a base for an IGBT or a gate for an FET, for instance.
11) The phrase "bidirectional circuit with controlled current conduction" connotes a generic phrase that includes a "bidirectional electron tube circuit," and also a bidirectional circuit that includes any of (a) an Insulated Gate Bipolar Transistor (IGBT) or Field-Effect Transistor (FET) or other semiconductor device that regulates current therethrough in a dynamically adjustable, continuously variable manner, (b) a terminal of a control winding of a saturable reactor, or (c) a rheostat (i.e., adjustable resistor).
12) The phrase "continuously variable" used in connection with current regulation, for instance, connotes the ability to have a non-broken (i.e., continuous) range of values of current, as opposed to having only non-continuous, discrete values.

For maximum efficiency in an AC power system, it is desired to improve the power factor in the system. Power factor is a dimensionless number representing the ratio of real power, expressed in kilowatts, flowing to an electrical load to the apparent power being provided, which includes any capacitive or inductive components in addition to any real power. The power factor can be expressed as between 0 (or 0%) for a pure inductive load and −1 (or −100%) for a pure kilowatt reverse power delivery, or as between 0 (or 0%) for a pure capacitive load and 1 (or 100%) for a pure kilowatt load. A power factor of 1 or 100% is considered ideal. Improving power factor may be typically accomplished by decreasing Volt-Ampere Reactance ("VAR") in the system. VAR is the unit used to express reactive power in an AC power system. Reactive power exists in an AC circuit when the current and voltage are not changing at the same time (out of phase). VARs may be considered as either the imaginary part of apparent power, or as the power flowing into a reactance load, where voltage and current are specified in Volts and Amperes; the two definitions are equivalent. Power Factor is also the cosine of the angle between the voltage and electrical current flowing in a circuit. Volt Amperes Power is the hypotenuse of a triangle constructed using the Real (kilowatt) Power as its base and the Volt Amperes Reactive Power (Vars) as the vertical side that is oriented 90 degrees to the base.

In the prior art, a Static VAR Compensator (SVC) or a Static Synchronous Compensator (STATCOM) can be used to reduce VAR in an AC power system by coupling or decoupling one or more reactive impedance elements to a power conveying line for a load. This may occur, for instance, by the process of connecting or disconnecting one or more capacitors or inductors between a power conveying line for a load and ground by one or more respective semiconductor or mechanical switches.

Drawbacks of using the foregoing semiconductor or mechanical switches for VAR reduction include limitations on the number of switching operations for mechanical switches before necessary replacement of switching contacts. This adds significant maintenance and replacement costs for the switching contacts.

Additionally, because the mentioned semiconductor or mechanical switches are limited in their voltage withstand capability to well below typical power conveying line voltage levels, the switches must be controlled so as to switch at, or very near to, zero current line crossings. Operation at higher-than-nominal line voltages can lead to serious damage and shortening of operation life of the switches.

A further drawback of using the mentioned semiconductor or mechanical switches for VAR reduction is the following: If the voltage on the power conveying line exceeds the voltage ratings of the switches or reactive impedance elements, then, in accordance with electrical industry practices, either the SVC or STATCOM will utilize a ferrous-core electrical transformer placed between the power conveying line, on the one hand, and the switches and reactive impedance elements, on the other hand. Such a ferrous-core electrical transformer is required to reduce the source voltage to a level that is tolerable to the switches and reactive impedance elements. Typically, this occurs where power conveying line voltages reach or exceed approximately 65 kVolts, which is standard on a power transmission line or many power distribution lines.

It would be desirable to avoid the use of mechanical or semiconductor switches, for increased reliability. Additionally, in systems of sufficiently high voltage operation, it would be especially desirable to avoid the need for a ferrous-core electrical transformer, which is expensive, bulky, occupies valuable floor space. Additionally, a ferrous-core electrical transformer of substantial size requires years to have manufactured, and an installation requiring such a ferrous-core electrical transformer will encounter significant capital costs.

BRIEF SUMMARY OF THE INVENTION

The present invention, in one form, provides the combination of (a) an AC power system having an AC power source and an electrical load that are interconnected by at least one power conveying line for conveying power from the AC power source to the electrical load and (b), a system for improving power factor of the AC power system by continuously variable, analog control of level of reactive current introduced into the power conveying line. A power factor-improving circuit includes at least one channel that comprises a channel-level AC electron tube circuit and at least one associated reactive impedance element interconnected in series manner. The AC electron tube circuit and the at least one associated reactive impedance element are coupled between the power conveying line of the AC power system and ground. Each of the channel-level AC electron tube circuit is responsive to a control system for continuously variable, analog control of the level of reactive current in the at least one associated reactive impedance element so that the foregoing level of reactive current charges, as necessary, in a continuously variable analog manner to improve power factor in the power conveying line. Each of the channel-level AC electron tube circuit comprises one AC cold-cathode field-emission electron tube rated at medium to high voltage or two unidirectional cold-cathode field-emission electron tubes rated at medium to high voltage and connected in anti-parallel manner.

The foregoing system for improving power factor in an AC power system avoids the use of semiconductor or mechanical switches by using, instead, a channel-level bidirectional electron tube circuit comprising a bidirectional cold-cathode field-emission electron tube rated at medium to high voltage. The channel-level bidirectional electron tube circuit may alternatively comprise two unidirectional cold-cathode field-emission electron tubes rated at medium to high voltage and connected in anti-parallel manner. Beneficially, the just-mentioned channel-level bidirectional electron tube circuit has a voltage standoff that may typically reach approximately one million volts or higher. This avoids the need for using a ferrous-core electrical transformer to provide a reduced voltage for each channel-level bidirectional electron tube circuit and associated reactive impedance element or elements where such a ferrous-core electrical transformer would normally be used.

An advantage that arises when using a bidirectional circuit with controlled current conduction as defined above is the ability to operate the foregoing circuit in analog mode, with a continuously variable controlled, gradual increase in conduction during the process of connecting a reactive impedance element(s) between power conveying line 106 (FIG. 1) and ground. This property reduces or eliminates the need for current-limiting energy-consuming devices such as series inductors when connecting capacitive reactance between a power conveying line and ground to improve power factor, thus eliminating, for instance, inductor energy and heat losses.

BRIEF DESCRIPTION OF THE DRAWINGS

Further features and advantages of the invention will become apparent from reading the following detailed description in conjunction with the following drawings, in which like reference numbers refer to like parts and in which phantom lines indicate alternative structure.

DETAILED DESCRIPTION OF THE PREFERRED EMBODIMENT

A list of reference numerals and associated parts is provided near the end of this detailed description of the preferred embodiment.

As used herein, the term "bidirectional high-voltage cold-cathode field-emission electron tube circuit" can refer to a bidirectional high-voltage cold-cathode field-emission electron tube circuit that operates in an analog manner to achieve voltage or current control, depending on the context in which the term is used. Alternatively, the term "bidirectional high-voltage cold-cathode field-emission electron tube circuit" is used to indicate a bidirectional high-voltage cold-cathode field-emission electron tube circuit that can operate in a binary manner and emulate an electrical switch.

General Overview of System for Improving Power Factor

Figure 1:
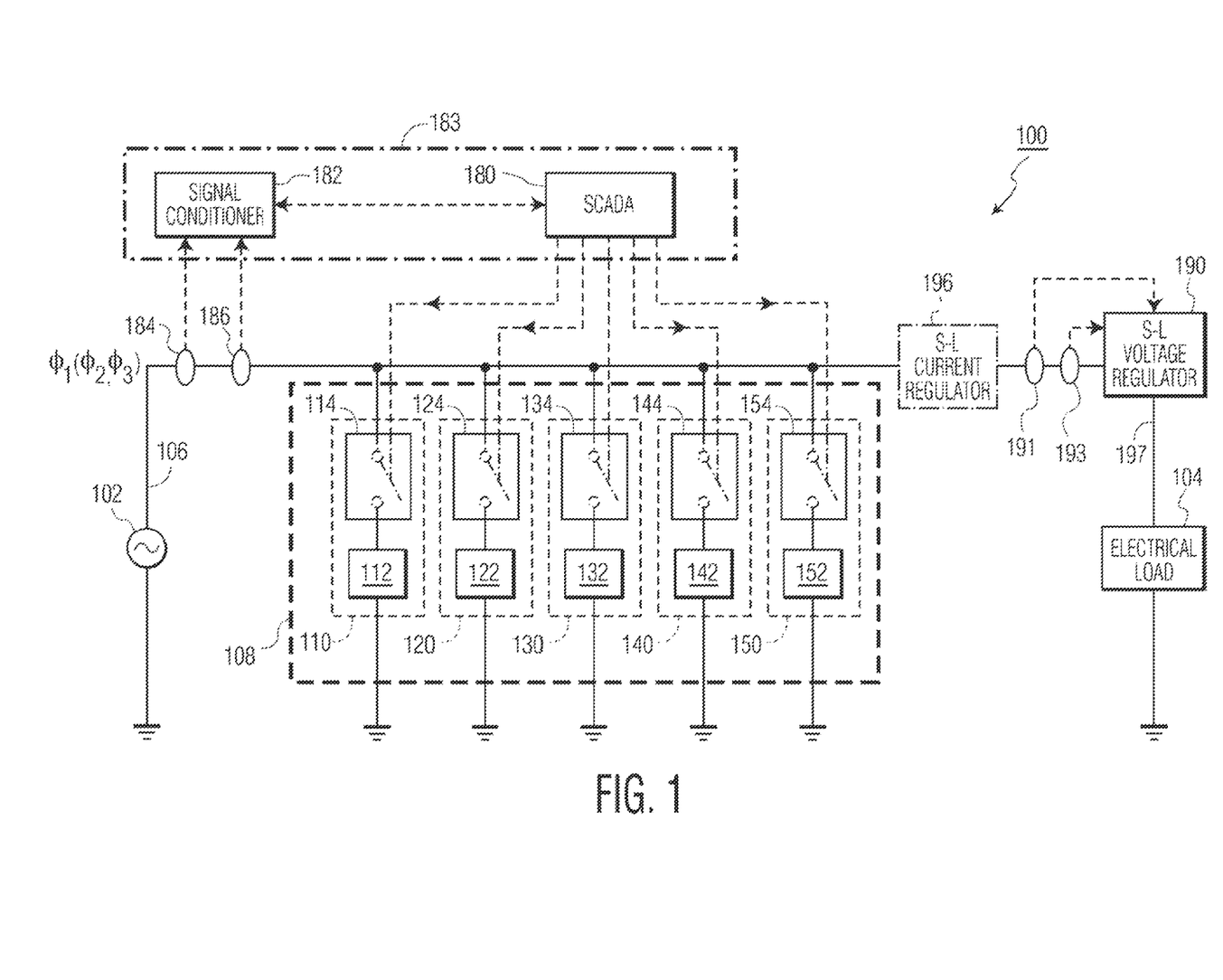
FIG. 1 is an electrical schematic diagram of a single phase of a three-phase AC power system and load, partly in block form, in which channels for connecting or disconnecting reactive impedance element(s) between a power conveying line and ground are provided for improving power factor.

FIG. 1 shows a single phase of a three-phase AC power system 100 in which an AC power source 104 provides electrical power to an electrical load 104 via a power conveying line 106. AC power source 102 may be an electrical generator or a power conveying line as defined above. Electrical load 104 is not necessarily used by the end consumer of electrical power, but may, for instance, include a ferrous-core electrical transformer for reducing source voltage. This description relates to improving power factor on a single power conveying line 106 marked as phase $\phi_1$. As is customary in the industry of AC power systems, FIG. 1 also indicates the existence of two (or more) other phases. Thus, FIG. 1 shows in parenthesis phases $\Phi_2$ and $\Phi_3$, to indicate that, in a preferred embodiment, AC power system 100 contains circuitry for improving power factor on the power conveying line for a second phase $\Phi_2$ (not shown) and, for improving power factor on a power conveying line for a third phase $\Phi_3$ (not shown). The respective circuitries for phases $\Phi_2$ and $\Phi_3$ may be the same as the circuitry described herein for improving power factor on power conveying line 106, and each circuitry normally operates independently of each other.

For the purpose of improving power factor on power conveying line 106, an embodiment of the invention provides a power factor-improving circuit 108. Power factor-improving circuit 108 comprises one or more channels for connecting or disconnecting reactive impedance element(s) between power conveying line 106 and ground for improving power factor of AC power system 100. FIG. 1 shows five channels 110, 120, 130, 140 and 150, each of which comprises one or more reactive impedance element(s), such as five reactive impedance element(s) 112, 122, 132, 142, and 152. Each channel contains a respective channel-level bidirectional electron tube circuit 114, 124, 134, 144 or 154. As used herein, "reactive impedance element(s)" connotes one or more reactive impedance elements, whereby, for instance, "reactive impedance element(s)" 112 constitutes one or more reactive impedance elements. Reactive impedance element(s) 112, 122, 132, 142, and 152 (hereinafter, also referred to as "reactive impedance element[s] 112, etc.") are each respectively associated with channel-level bidirectional electron tube circuit 114, 124, 134, 144 or 154.

Figure 2:
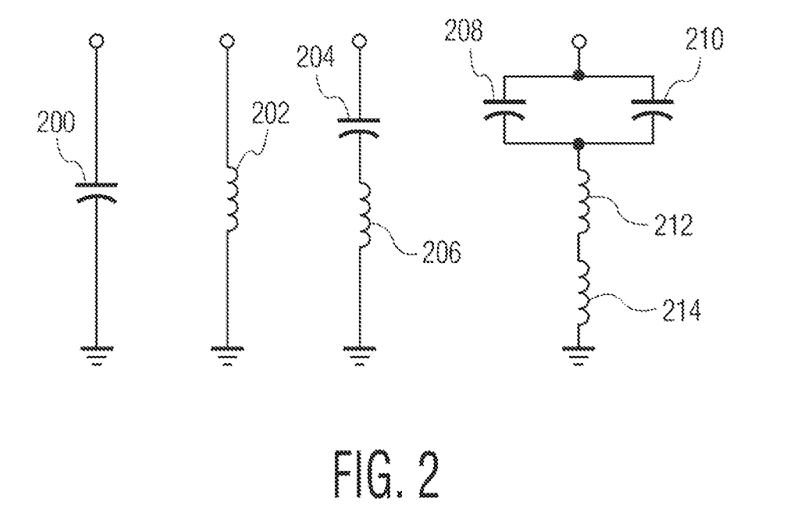
FIG. 2 are electrical schematic diagrams of various reactive impedance elements that can be used in the circuit of FIG. 1.

As shown in FIG. 2, various reactive impedance elements can be used in the circuit of FIG. 1. For instance, a reactive impedance element may comprise a capacitor 200, an inductor 202, or a serially connected capacitor 204 and inductor 206. A reactive impedance element may also comprise multiple capacitors 208 and 210 that are coupled to multiple inductors 212 and 214. In the circuit shown in FIG. 2, capacitors 208 and 210 are shown connected in parallel relationship with each other, and inductors 212 and 214 are shown connected in series relationship with each other. The selection of other combinations of reactive impedance elements will be routine to persons of ordinary skill in the art based on the present specification.

Example Using Preferred 1-1-2-5-10 Combination of Reactance Values

The number of channel-level bidirectional electron tube circuits and associated reactive impedance element(s) can vary widely to meet the specific needs of improving power factor on any given power conveying line. A preferred combination of channel-level bidirectional electron tube circuits and reactive impedances arises from using five channel-level bidirectional electron tube circuits 114, 124, 134, 144 and 154 (hereinafter, also referred to as "channel-level bidirectional electron tube circuits 114, etc.") and respectively associated five reactive impedance element(s) 112, etc., shown in FIG. 1, with the reactive impedance element(s) configured as follows: Each reactive impedance element(s) 112, etc., includes at least one reactive impedance element, such as capacitor 200 in FIG. 2. Reactive impedance element(s) 112 and 122 can each have approximately a base reactance value; reactive impedance element(s) 132 can have approximately two times the base reactance value; reactive impedance element(s) 142 can have approximately five times the base reactance value; and reactive impedance element(s) 152 can have approximately ten times the base reactance value. This is a so-called 1-1-2-5-10 combination of reactance values.

The mentioned 1-1-2-5-10 combination of reactance values allows connection or disconnection of selected reactive impedance element(s) 112, etc. between power conveying line 106 and ground by respective channel-level bidirectional electron tube circuits 114, etc. so as to have approximately any integer multiple of the mentioned base reactance value between one and nineteen in the example given. This allows selection of finely varying values of reactive impedance to be connected or disconnected between power conveying line 106 and ground. To increase such ability to select finely varying values of reactive impedance, one or more other reactive impedance element(s), each associated with a respective bidirectional electron tube circuit, can be added to the circuitry of FIG. 1. Thus, a further reactive impedance element(s) can have approximately 50 percent of the base reactance value, or approximately ten times the base reactance value, by way of example.

The ability to select finely varying values of reactive impedance, as just mentioned, allows a user to more accurately improve power factor to the level which is desired, compared with prior art approaches. This is because the prior art approaches typically use a coarser set of impedance values that often will not closely match the instantaneous impedance of a given power conveying line. Accordingly, the prior art approaches are often less efficient and cause financial loss compared with using a finer set of impedance values according to the mentioned 1-1-2-5-10 combination of reactance values, for instance.

Some prior art approaches would fail to effectively prevent damage to downstream system components, whereas the finer set of 1-1-2-5-10 combination of reactance values, for instance, would prevent such damage. As a case in point, when matching a power factor-improving reactive impedance to the impedance of an instantaneous load, as the two impedance values approach each other in value, the load voltage rises. A sufficiently increased load voltage is well known to be damaging to downstream system components. The combination of the finer gradations of reactance values by using a 1-1-2-5-10 combination of reactance values, for instance, and the inclusion of system-level voltage regulator 190 of FIG. 1 (described below) can mitigate, or entirely eliminate, this problem.

Additionally, the ability to select finely varying values of reactive impedance affords a user of multiple electrical loads a reduction in the cost of electrical power. For instance, a user can more finely improve power factor for each respective load or combination of loads. Power companies typically charge for supplying reactive power (i.e., VARs) that occurs when power factor is low, in addition to charging for supplying non-reactive power. The contrasting prior art limitation of improving power factor more coarsely usually results in a greater consumption of VARs and higher associated costs for such VARs.

Preferred Bidirectional Electron Tube Circuits

Figure 3:
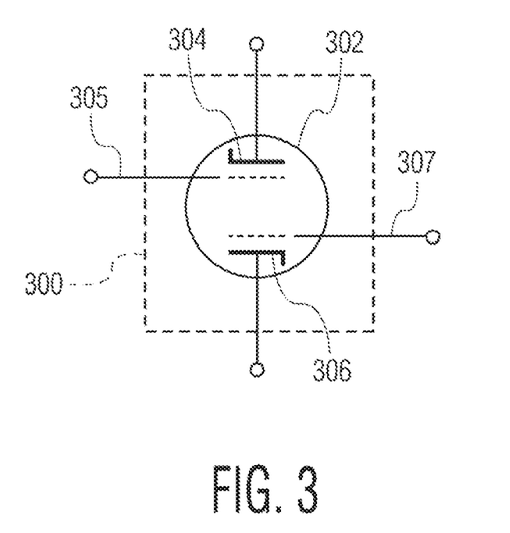
FIG. 3 is an electrical schematic diagram of a preferred bidirectional high-voltage cold-cathode field-emission electron tube circuit.

FIG. 3 shows a bidirectional electron tube circuit 300 containing a preferred bidirectional electron tube 302 for implementing bidirectional electron tube circuits, such as channel-level bidirectional electron tube circuits 114, etc., of FIG. 1, or system-level bidirectional electron tube circuits to be described below. The symbol for bidirectional electron tube 302 has been adopted by the present inventor and is generally based on standard symbology for electron tubes as defined by JEDEC (the Joint Electron Devices Committee). Bidirectional electron tube 302 is preferably a bidirectional cold-cathode field-emission electron tube rated at medium to high voltage, such as shown and claimed in U.S. Pat. No. 8,300,378 B2, in FIGS. 6C-6D and claim 53, for example, by the present inventor and assigned to the present assignee. Bidirectional electron tube 302, which is also referred to as a "Bi-tron" electron tube, has internal "cathanodes" 304 and 306 and associated grids 305 and 307. Cathanodes 304 and 306 can act as either a cathode or an anode depending on polarity of voltage applied between cathanodes 304 and 306. Details of the cathanodes of a Bi-tron electron tube may be found in the foregoing patent.

Figure 4:
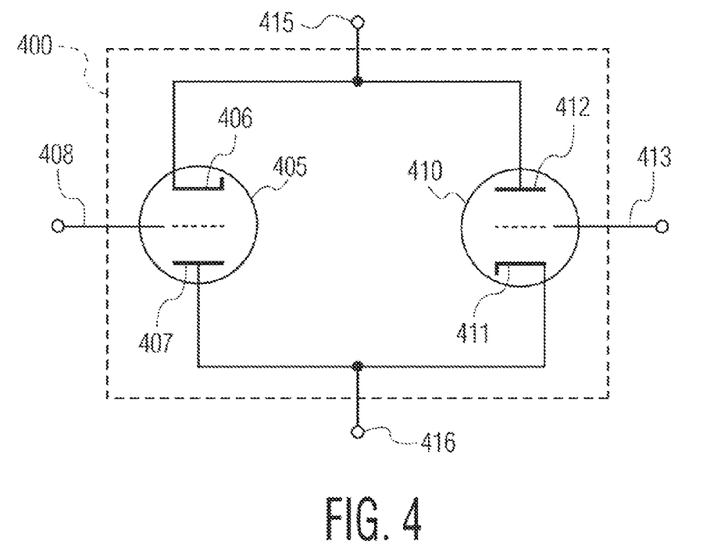
FIG. 4 is an electrical schematic diagram of another bidirectional high-voltage cold-cathode field-emission electron tube circuit that may be used instead of the bidirectional high-voltage cold-cathode field-emission electron tube circuit shown in FIG. 3.

FIG. 4 shows an alternative to bidirectional electron tube circuit 300 of FIG. 3, for implementing channel-level bidirectional electron tube circuits 114, etc., of FIG. 1, or system-level bidirectional electron tube circuits to be described below. The alternative is bidirectional electron tube circuit 400, containing a pair of unidirectional cold cathode field emission electron tubes 405 and 410, which conform to the electron tubes described in the above-mentioned U.S. Pat. No. 4,950,952, and are referred to as Pulsatron electron tubes. Unidirectional cold cathode field emission electron tube 405 has a cathode 406, anode 407 and grid 408; and unidirectional cold cathode field emission electron tube 410 has a cathode 411, anode 412 and grid 413. Unidirectional cold cathode field emission electron tubes 405 and 410 are connected in anti-parallel manner, so as to provide bidirectional control for AC voltage across nodes 415 and 416, and thus may be used instead of the bidirectional electron tube circuit 300 of FIG. 3.

Either the bidirectional electron tube 300 of FIG. 3, comprising a bidirectional cold cathode field emission electron tube, or the pair of anti-parallel connected unidirectional cold cathode field emission electron tubes of FIG. 4 as discussed in the foregoing two paragraphs, implement the "bidirectional electron tube circuit" as that term is used herein. Such "bidirectional electron tube circuit" can operate in an analog manner to achieve voltage or current control, depending on the context in which the term is used. Alternatively, a "bidirectional electron tube circuit" can operate in a binary manner and emulate an electrical switch.

Either the bidirectional electron tube circuit 300 of FIG. 3 or the alternative bidirectional electron tube circuit 400 of FIG. 4, when formed of cold cathode field emission tube(s), are preferred, rather than mechanical or semiconductor switches, due to the following characteristics that such electron tubes possess:

1) High standoff voltage, which may typically reach approximately one million volts or higher.
2) Large current capacity, which may typically reach approximately hundreds of thousands of amperes continuously.
3) Immunity to internal arcing, transient voltages, and electrical system switching surges.
4) Typical immunity to thermally induced destructive effects that are typical of semiconductor devices, because the subject bidirectional electron tube circuits can easily be made to operate over a temperature range from −200° F. to +1000° F. (−129° C. to +538° C.) without the need for external temperature-control means.
5) Orders of magnitude higher durability, and, hence, higher reliability compared to mechanical or semiconductor switches, whereby the electron tubes may undergo connecting operations orders of magnitude more times than mechanical or semiconductor switches.
6) Orders of magnitude reduced power loss compared to mechanical or semiconductor switches, as a result of extremely low voltage drop of the tubes.
7) Lower cost than semiconductor or mechanical switches for given voltage and current ratings.
8) The ability to implement a controlled, gradual increase in conduction during the process of connecting a reactive impedance element(s) between power conveying line 106 (FIG. 1) and ground when operated in analog mode with continuously variable current-regulation capacity as described below; this property reduces or eliminates the need for current-limiting energy-consuming devices such as series inductors when connecting capacitive reactance between power conveying line 106 and ground to improve power factor, thus eliminating, for instance, inductor energy and heat losses.

A unique advantage arises when using cold cathode field emission tubes for channel-level bidirectional electron tube circuits 114, etc. (FIG. 1) when manufactured with the high standoff voltage mentioned in the foregoing point 1; such standoff voltage can, if desired, exceed one million or more volts in a single device, where the power conveying line 106 constitutes a power transmission line as defined above. In this situation, such electron tubes and associated reactive impedance element(s) 112, etc., can be directly connected to power conveying line 106, when comprising a power transmission line as defined above, without the use of (i.e., being "free of") a ferrous-core electrical transformer. In other words, channel-level bidirectional electron tube circuits 114, etc. are preferably connected substantially directly to power conveying line 106, where "substantially directly" means herein without the interposition of inductance, resistance, capacitance or other circuit elements, such as a ferrous-core electrical transformer, that would significantly alter the intended behavior of the power factor-improving circuitry described above.

Another way of stating the foregoing, unique advantage is that each channel-level bidirectional electron tube circuit 114, etc. has a standoff voltage exceeding a nominal operating voltage of the power conveying line 106, wherein the nominal operating voltage is characterized as follows: Power conveying line 106 has a sufficiently high nominal operating voltage such that a ferrous-core electrical transformer would be used to transition the voltage from the power conveying line to a lower voltage suitable for use with one or more switches selected in accordance with electrical power industry practices existing before Mar. 24, 2014 for connecting one or more reactive impedances between the power conveying line and ground for improving power factor on the power conveying line. Exemplary electrical power industry practices to be considered in the foregoing sentence are those of the United States of America, Canada or Europe. The mentioned electrical industry practices before Mar. 24, 2014 includes the use of mechanical or semiconductor switches.

Channel-Level Current Regulation

Figure 5:
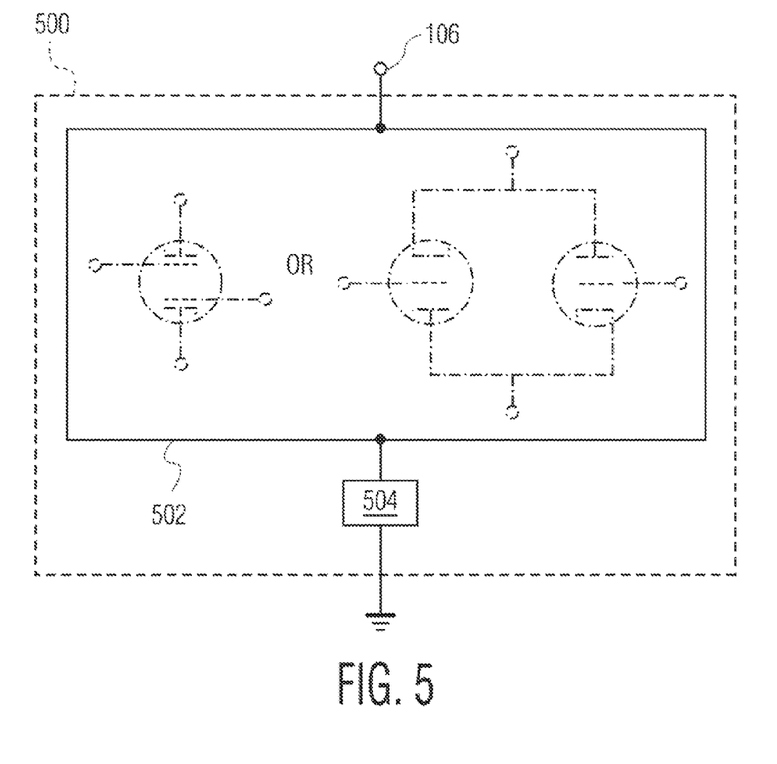
FIG. 5 is an electrical schematic diagram, partly in block form, of a preferred channel that may be used in the circuit of FIG. 1 for beneficially controlling current through the channel in addition to connecting or disconnecting reactive impedance element(s) between a power conveying line and ground.

FIG. 5 shows a preferred channel 500 that may be used in the circuit of FIG. 1. Channel 500 includes a channel-level bidirectional electron tube circuit 502 and associated reactive impedance element(s) 504. Channel 500 can, beneficially, control current through the channel during the process of connecting or disconnecting reactive impedance element(s) between power conveying line 106 of FIG. 1 and ground. The ability to control current, for instance, to prevent potentially destructive current spikes, advantageously can prevent undesirably high current from being introduced into power conveying line 106 (FIG. 1) during the process of connecting or disconnecting a reactive impedance element(s) between the power conveying line 106 (FIG. 1) and ground.

Two ways of controlling current through the channel are now described, wherein one or more cold cathode field emission electron tubes, operating in analog manner, are used in channel-level bidirectional electron tube circuit 502.

To indicate operation of cold cathode field emission electron tubes in analog manner, the block in FIG. 5 for channel-level bidirectional electron tube circuit 502 includes phantom-line shown alternative implementations as either a bidirectional electron tube circuit comprising a single bidirectional cold cathode field emission electron tube (e.g., 302, FIG. 3) rated at medium to high voltage or a bidirectional electron tube circuit comprising two unidirectional cold cathode field emission electron tubes rated at medium to high voltage and connected in anti-parallel manner (e.g., 405 and 410, FIG. 4).

Figure 6:
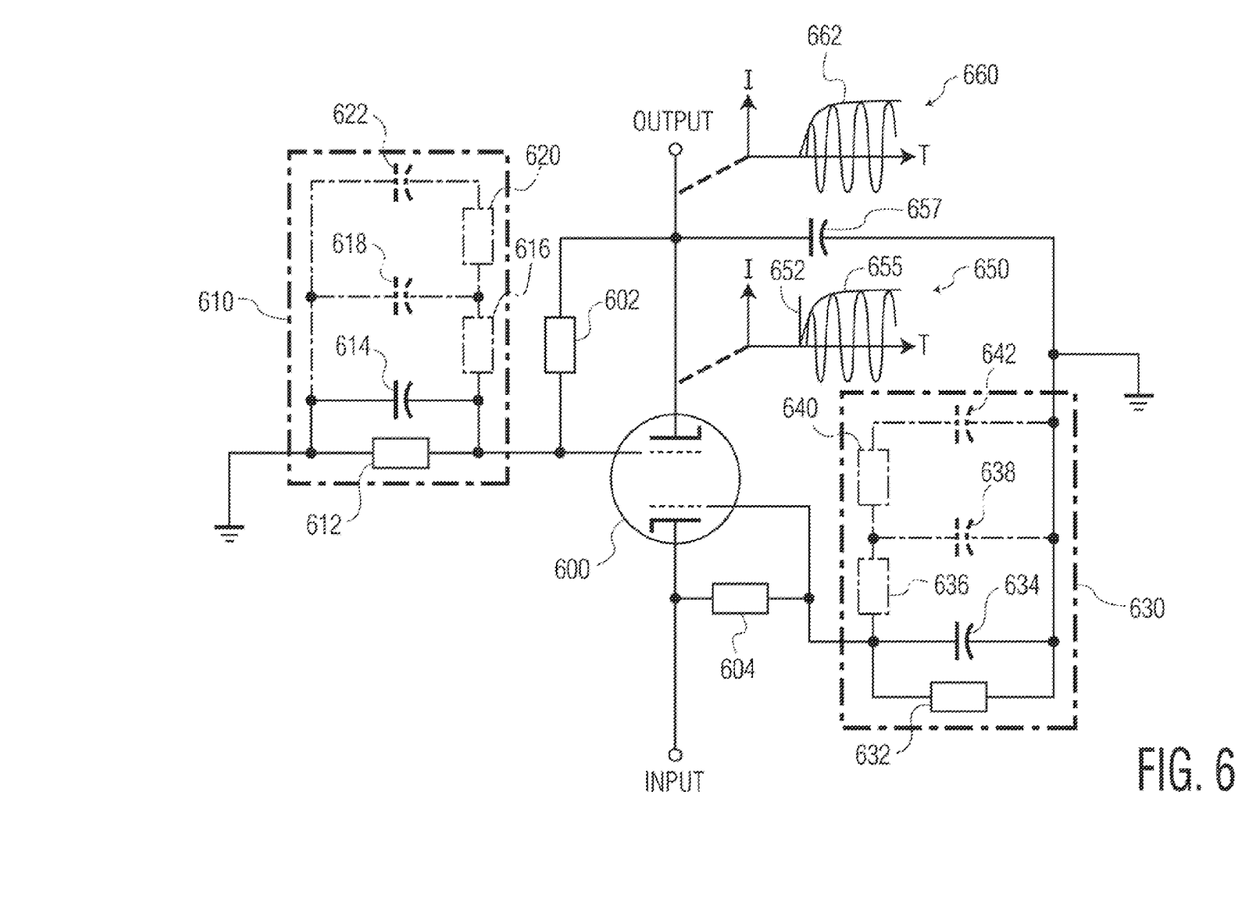
FIG. 6 is an electrical schematic diagram of a bidirectional electron tube circuit and associated current-limiting circuitry that limits current to a fixed maximum value and that may be used to implement part of the channel shown in FIG. 5.

FIG. 6 shows a first way of controlling current through the channel 500 of FIG. 5, wherein the circuit of FIG. 6 implements channel-level bidirectional electron tube circuit 502 of FIG. 5.

GRID-CONTROLLED CURRENT-LIMITER CIRCUITS WITH ANALOG TUBE OPERATION. In FIG. 6, a circuit topology is described that varies from the topology of the current-regulating circuit of U.S. Pub. No. US 2012/0081097 A1, entitled High Voltage High Current Regulator by the same inventor as for the present invention. The foregoing patent publication is incorporated herein in its entirety by reference. In the foregoing patent publication, a current-regulating circuit (not shown herein) uses first and second current-sensing "grid control" electron tubes to measure and determine the instantaneous current. Such current-regulating circuit uses a feedback circuit in conjunction with a voltage-divider circuit to form a current regulator, which responds in real-time to instantaneous changes in current flowing between first and second terminals to increase or decrease current in a dynamically adjustable, continuously variable, controlled manner.

In comparison, the current regulator of FIG. 6 eliminates the pair of current-sensing "grid control" tubes of the current-regulating circuit of U.S. Pub. No US 2012/0081097 A1. The current regulator of FIG. 6 replaces them with a pair of pulse-forming networks (PFNs) and modified bias networks, which control the turn-on rate of current-regulating electron tube 600, such as a Bi-tron electron tube as described above in connection with FIG. 3, or two anti-parallel connected Pulsatron tubes as described above in connection with FIG. 4. Either the Bi-tron electron tube or the anti-parallel connected Pulsation tubes operate in analog manner and regulate current. Each of PFNs 610 and 630 constitutes a grid-control current-limiter circuit that limits current in current-regulating tube 600 to a fixed maximum value in a continuously variable manner. The following description assumes that the current-regulating electron tube is a bidirectional cold cathode field emission, or Bi-tron, electron tube, although it can be embodied, as mentioned, as anti-parallel connected Pulsatron tubes as shown in FIG. 4.

Bias resistors 602 and 604 provide biasing of the upper- and lower-shown grids of current-regulating electron tube 600. PEN 610 is associated with the upper-shown grid of current-regulating electron tube 600 and PFN 630 is associated with the lower-shown grid of current-regulating electron tube 600. A first stage of PFN 610 includes a resistor 612 and capacitor 614 that are connected in parallel. Similarly, a first stage of PEN 630, which is associated with the lower-shown grid of current-regulating electron tube 600, includes a resistor 632 and capacitor 634 that are connected in parallel.

In PFN 610, a first-stage R-C network comprises a very high value resistor and a capacitor (resistor 612 and capacitor 614) sized to produce a slow change in the associated grid voltage of current-regulating electron tube 600. Similarly, in PEN 630, a first-stage R-C network also comprises a very high value resistor and a capacitor (resistor 632 and capacitor 634) sized to produce a slow change in the associated grid voltage of current-regulating electron tube 600. This slows the turn on time of current-regulating electron tube 600. Thus, in graph 650 in FIG. 6, envelope 655 shows the average value of current "I" of current-regulating electron tube 600 slowly increasing over time, and the sinusoidal waveforms beneath envelope 655 indicate the bidirectional nature of current flow through current-regulating electron tube 600. The slow increase in current "I" approximates that of the well-known proportional-integral-derivative (PID) curve found in many conventional power controllers.

Beneficially, the slow rise in current "I" shown in graph 650 in FIG. 6 prevents capacitive reactance used to improve power factor from discharging too rapidly and causing harmonic distortion of current in power conveying line 106 of FIG. 1. Because the conduction of current by current-regulating electron tube 600 is done in analog fashion, the current increases in a smooth manner. This contrasts with the use of solid state switches, which result in increase of current in a staircase manner, which would add harmonic current content to an associated power conveying line.

PFNs 610 and 630 may include additional stages to slow the rise of current "I" such as shown in phantom in graph 650 in FIG. 6. By way of example, two further stages for PFN 610 are a second stage formed of a resistor 616 and capacitor 618 connected in parallel, and a third stage formed of a resistor 620 and capacitor 622 connected in parallel. Similarly, two further stages for PFN 630 are a second stage formed of a resistor 636 and capacitor 638 connected in parallel, and a third stage formed of a resistor 640 and capacitor 642 connected in parallel.

As shown by graph 650 in FIG. 6, current-regulating electron tube 600 has a sufficiently fast turn-on time that it produces a narrow spike 652 at the beginning of envelope 655. This is an undesirable characteristic and is addressed by use of a bypass capacitor 657 attached between the upper-shown terminal of current-regulating electron tube 600 and ground. Bypass capacitor 657 is sized to bypass the turn-on spike 652 to ground, without interfering with the controlled turn-on graph 660, whose envelope 662 is now free from spike 652 of the prior envelope 655.

The circuit as described above, including pulse-forming networks (PFNs) 610 and 630, regulates current by limiting the current in a continuously variable manner to a fixed, maximum output operating current and corresponding controlled turn-on time, of, typically, 15 to 45 milliseconds; this contrasts with the circuit of above-cited U.S. Pub. No. US 2012/0081097 A1, which provides a dynamically adjustable, continuously variable, grid-controlled current-limiting function to either increase or decrease current.

Referring to FIG. 6, it will be obvious to one of ordinary skill in the art that there are a number of alternative current-limiting topologies that can be implemented utilizing the Bi-tron electron tube of FIG. 3 or the anti-parallel connected Pulsatron tubes of FIG. 4.

A person of ordinary skill in the art would find it routine, in view of the present specification, to modify the circuit of FIG. 6 by replacing current-regulating electron tube 600 with the following types of bidirectional circuit with controlled current conduction: An Insulated Gate Bipolar Transistor (IGBT) or Field-Effect Transistor (FET) or other semiconductor device that regulates current therethrough in an analog manner and that, as a single one or a plurality of such devices, is rated at medium to high voltage and has adequate current capacity. A person of ordinary skill in the art would find it routine to modify pulse-forming networks (PFNs) 610 and 630 of FIG. 6 for use with the foregoing types of semiconductor devices.

CONTINUOUSLY VARIABLE CURRENT-REGULATOR CIRCUIT WITH ANALOG TUBE OPERATION. A second way of controlling current through channel 500 of FIG. 5 is now described, wherein one or more cold cathode field emission electron tubes, operated in analog manner, are used in channel-level bidirectional electron tube circuit 502.

According to the second way of controlling current through channel 500 (FIG. 5), channel-level bidirectional electron tube circuit 502 can use the same topology as the current regulator described in above-cited U.S. Pub. No. US 2012/0081097 A1. The current regulator (not shown herein) in the foregoing publication includes at least one main-current carrying cold-cathode field emission electron tube that conducts current between first and second terminals of the current regulator. The at least one main-current carrying cold-cathode field emission electron tube has first and second control grids for controlling current conduction between such first and second terminals when the voltage on the first and second terminals is positive and negative, respectively. Additional first and second cold-cathode field emission electron tubes (not shown) respectively provide control signals for the first and second grids. The foregoing electron tubes would have medium to high voltage ratings for use in the present invention.

When implementing bidirectional electron tube circuit 500 (FIG. 5) with the foregoing current regulator topology, bidirectional electron tube circuit 500 provides dynamic regulation of current flow, owing to the mentioned use of a feedback circuit in conjunction with a voltage-divider circuit, as described in the foregoing cited patent publication, to form the current regulator. This allows the bidirectional electron tube circuit 500 to dynamically adjust (i.e., regulate) current flow in analog fashion, allowing current to be increased or decreased in a continuously variable, grid-controlled manner over a considerable range of current densities.

An alternative to implementing bidirectional electron tube circuit 500 (FIG. 5) with the foregoing current regulator topology of above-cited U.S. Pub. No. US 2012/0081097 A1 is to substitute instead one of the following types of bidirectional circuit with controlled current conduction: (a) an Insulated Gate Bipolar Transistor (IGBT) or Field-Effect Transistor (FET) or other semiconductor device that regulates current therethrough in a dynamically adjustable, continuously variable manner, or (b) a saturable reactor, or (c) a rheostat (i.e., adjustable resistor), wherein a single one or a plurality of such devices is rated at medium to high voltage and has adequate current capacity. A person of ordinary skill in the art would find it routine to make the necessary modifications to, or substitutions for, the circuitry of the above-cited U.S. Pub. No. US 2012/0081097 A1 for controlling the foregoing types of bidirectional circuits with controlled conduction.

BINARY OPERATION OF CHANNEL-LEVEL ELECTRON TUBES. Although the foregoing two ways of regulating current through channel 500 of FIG. 5 are preferred, it is also possible to operate channel-level bidirectional electron tube circuits 114, etc. of FIG. 1 without current regulation, in a digital manner, By "binary operation" is meant operation emulating an electrical switch, which is either fully open to stop current flow, or is fully closed to enable current flow. Because the channel-level bidirectional electron circuits 114, etc. include electron tubes of the type described above in connection with FIG. 3 or 4, such circuits 114, etc. switch between fully open and fully closed states in a continuously variable, analog manner. Accordingly, each of the foregoing bidirectional electron tube circuits is shown in FIG. 1 by a block containing a phantom-line depiction of an electrical switch, to indicate one alternative manner of operation.

Mitigating System-Level Voltage and Current Surges

The above-described connection or disconnection of reactive impedance element(s) between power conveying line 106 and ground to improve power factor, when using channel-level current regulation, will normally mitigate to a considerable extent both voltage and current surges on power conveying line 106 that are due to any transient at near-resonant conditions. However, to the extent that channel-level current regulation does not fully mitigate such voltage or current surges, or if channel-level current regulation is not used, AC power system of FIG. 1 preferably includes a system-level voltage-regulator 190 and a system-level current-regulator 196.

SYSTEM-LEVEL VOLTAGE REGULATION. System-level (or S-L) voltage regulator 190 may comprise, as shown in FIG. 1, a single circuit serially connected in power conveying line 106, between power factor-improving circuit 108 and electrical load 104. System-level voltage regulator 190 protects electrical load 104 from overvoltage that may arise when approaching a matching point between impedance of AC source 102 and impedance of electrical load 104 while operating power factor-improving circuit 108. It is well known in the art that such overvoltage typically occurs as an optimal power factor is being approached. In FIG. 1, system-level voltage regulator 190 responds to electrical conditions on power conveying line 106, such as voltage, current and phase angle, which may be determined from sensing voltage on power conveying line 106 by transducer 191 and sensing current on power conveying line 106 by transducer 193. Transducers 191 and 193 may be the same type of "potential" transformer and "current" transformer transducers as mentioned below for transducers 184 and 186.

Figure 7:
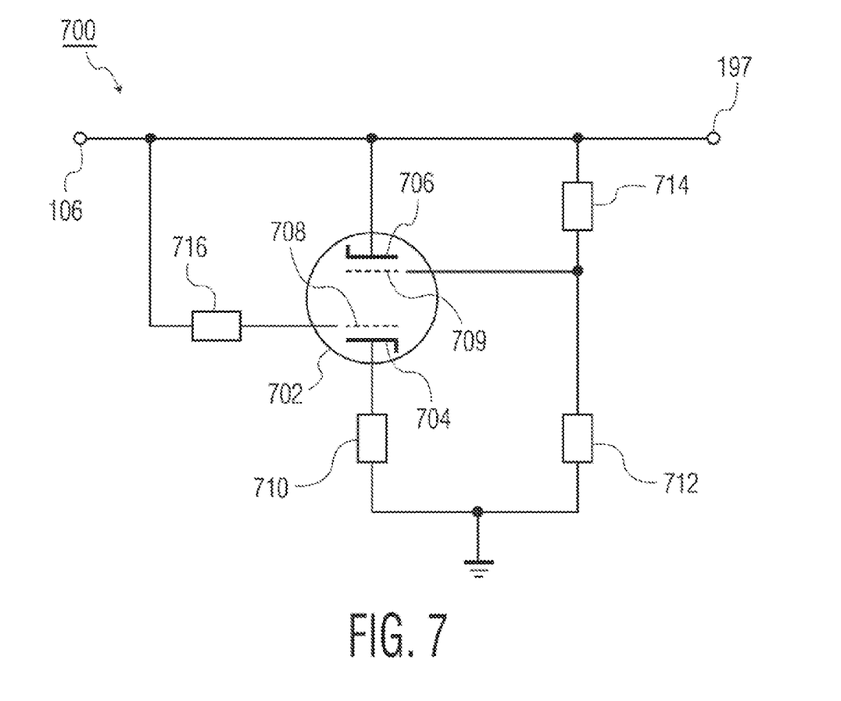
FIG. 7 is an electrical schematic diagram, partly in block form, of an S-L (i.e., system-level) voltage regulator that may be used in the circuit of FIG. 1.

For implementing system-level voltage regulator 190, FIG. 7 shows a preferred system-level voltage regulator 700 connected between power conveying line 106 and power conveying line 197. A bidirectional cold cathode field emission electron tube 702, also known as a Bi-tron electron tube and being synonymous herein with bidirectional electron tube circuit 300 (FIG. 3) or 400 (FIG. 4), is used as an active voltage-regulation element. Bidirectional cold cathode field emission electron tube 702 preferably has its cylindrical outermost electrode or cathanode 704 connected to ground via a resistor 710 and its central cylindrical or solid electrode or cathanode 706 connected to power conveying line 197. A first control grid 708 is associated with cathanode 704 of bidirectional cold cathode field emission electron tube 702, and a second control grid 709 is associated with cathanode 706 of bidirectional cold cathode field emission electron tube 702. These control grids 708 and 709 provide a means for control of current flow through bidirectional cold cathode field emission electron tube 702.

Bidirectional cold cathode field emission electron tube 702 has a threshold operating voltage. An external circuit for biasing bidirectional cold cathode field emission electron tube 702, comprising resistor 710 and resistors 712, 714 and 716, for instance, is used to set the threshold operating voltage for operation of bidirectional cold cathode field emission electron tube 702. Resistors 712 and 714 are used to set the bias for control grid 709 of bidirectional cold cathode field emission electron tube 702, and resistors 710 and 716 are used to set the bias for control grid 508. Selection of component values as well as variations in the biasing circuitry will be routine to those of ordinary skill in the art based on the present specification.

Selection of many other topologies of suitable voltage regulators will be routine to persons of ordinary skill in the art in view of the present specification. For instance, an alternative system-level voltage regulator using semiconductor devices instead of the above-mentioned channel-level bidirectional cold cathode field emission electron tube 502 can be employed.

A benefit of using bidirectional cold cathode field emission electron tube 702 in system-level voltage regulator 700 (i.e., Bi-iron electron tube), or using a pair of unidirectional cold cathode field emission electron tubes 405 and 410 (FIG. 4) connected in anti-parallel manner (e.g., a pair of anti-parallel connected Pulsation electron tubes), is the medium to high voltage and high current capabilities that can be incorporated into such electron tubes. These medium to high voltage and high current capabilities eliminate the need for multiple semiconductor devices in series or parallel (or both) to achieve a desired rating for voltage or current (or both). The medium to high voltage and high current capabilities also allow for the connection or disconnection of reactive impedance element(s) 112, etc. by channel-level bidirectional electron tube circuits 114, etc., in FIG. 1 to occur other than at the zero crossings of current on power conveying line 106, which is typically not the case when using the foregoing semiconductor devices.

The use of other suitable voltage regulation circuits will be apparent to persons of ordinary skill in the art based on the present specification. For instance, bidirectional cold cathode field emission electron tube 702 of FIG. 7, which is synonymous with bidirectional electron tube circuit 300 of FIG. 3, could be replaced with any of the following semiconductor devices: A bidirectional circuit with controlled current conduction implemented with one or more Insulated Gate Bipolar Transistors (IGBTs) or Field-Effect Transistors (FETs) or other semiconductor device(s) that increase or decrease current therethrough in a controlled, dynamically adjustable, continuously variable manner, wherein a single one or a plurality of such devices is rated at medium to high voltage and has adequate current capacity. Modification of the circuitry of FIG. 7 for accommodating one or more of the foregoing semiconductor devices will be routine to persons of ordinary skill in the art based on the present specification.

Figure 8:
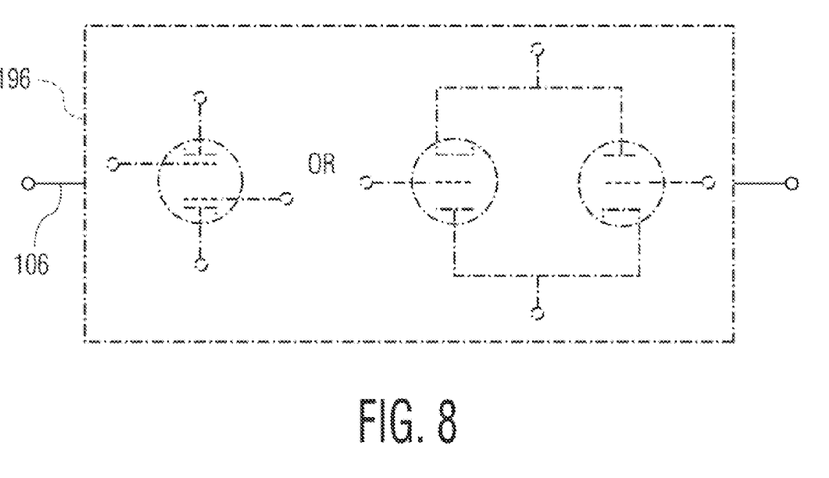
FIG. 8 is an electrical circuit diagram, partly in block form, of an S-L (i.e., system-level) current regulator that may be used in the circuit of FIG. 1.

SYSTEM-LEVEL CURRENT REGULATION, System-level (or S-L) current regulation may be carried out with optional current regulator 196 of FIG. 1, shown in phantom, as a single circuit interposed in power conveying line 106 between power factor-improving circuit 108 and system-level voltage regulator 190. A preferred topology for current regulator 196 is described below. FIG. 8 shows a block for current regulator 196 containing phantom-line alternative implementations as either a bidirectional electron tube circuit comprising a single bidirectional cold cathode field emission electron tube (e.g., 302, FIG. 3) or a bidirectional electron tube circuit comprising two unidirectional cold cathode field emission electron tubes connected in anti-parallel manner (e.g., 405 and 410, FIG. 4). Both of the foregoing bidirectional electron tube circuits are preferably rated at medium to high voltage. These phantom-line depictions of electron tube circuits indicate electron tube operation in analog manner.

A preferred implementation of system-level current regulator 195 is to use the same topology as the current regulator described in above-cited U.S. Pub. No. US 2012/0081097 A1. The system-level current regulator (not shown herein) in the foregoing publication includes at least one main-current carrying cold-cathode field emission electron tube that conducts current between first and second terminals of the system-level current regulator. The at least one main-current carrying cold-cathode field emission electron tube has first and second control grids for controlling current conduction between such first and second terminals when the voltage on the first and second terminals is positive and negative, respectively. Additional first and second cold-cathode field emission electron tubes respectively provide control signals for the first and second grids. A current-regulating circuit uses first and second current-sensing "grid control" electron tubes to measure and determine the instantaneous current. Such current-regulating circuit uses a feedback circuit in conjunction with a voltage-divider circuit to form a current regulator, which responds in real-time to instantaneous changes in current flowing between first and second terminals. This allows the bidirectional electron tube circuit 500 to dynamically adjust (i.e., regulate) current flow up or down in analog fashion, allowing current to be increased or decreased in a continuously variable, grid-controlled manner over a considerable range of current densities.

The mentioned "at least one main-current carrying cold-cathode field emission electron tube" referred to in the foregoing paragraph is synonymous herein with the bidirectional electron tube circuits of FIGS. 3 and 4.

The foregoing implementation of system-level current regulator 196 is desirable for power transmission line usage, because it allows a simple topologic implementation of a current flow-control device. This addresses a long-standing need in the electric power industry for transmission voltage, high-current flow control devices to increase the efficiency of transmission lines.

An alternative to implementing system-level current regulator 195 with the foregoing current regulator topology of above-cited U.S. Pub. No. US 2012/0081097 A1 is to substitute for the "at least one main-current carrying cold-cathode field emission electron tube" (or synonymously, "bidirectional electron tube circuit") one of the following types of bidirectional circuit with controlled current conduction: (a) an Insulated Gate Bipolar Transistor (IGBT) or Field-Effect Transistor (FET) or other semiconductor device that regulates current therethrough in an analog, dynamically adjustable, continuously variable manner, or (b) a saturable reactor, or (c) a rheostat (i.e., adjustable resistor), wherein a single one or a plurality of such devices is rated at medium to high voltage and has adequate current capacity. A person of ordinary skill in the art would find it routine to make the necessary modifications to, or substitutions for, the circuitry of the above-cited U.S. Pub. No. US 2012/0081097 A1 for controlling the foregoing types of bidirectional circuits with controlled conduction.

A further implementation of system-level current regulator 196 is to use a bidirectional electron tube circuit using grid-controlled, current-limiting circuits as described above in connection with FIG. 6. The use of such grid-controlled, current-limiting circuits provides a desirable current-regulating, current-limiting function, but, as mentioned above, the current is regulated by limiting the current in a continuously variable manner to a fixed, maximum output operating current and corresponding controlled maximum turn-on time, of, typically, 15 to 45 milliseconds; this contrasts with the circuit of above-cited U.S. Pub. No. US 2012/0081097 A1, which provides a dynamically adjustable, continuously variable, grid-controlled current-regulating function for increasing or decreasing current.

An alternative to the "further implementation of system-level current regulator 196" of the foregoing paragraph is to use the variation of the circuit for FIG. 6 described in the last paragraph above under "GRID-CONTROLLED CURRENT-LIMITER CIRCUITS WITH ANALOG TUBE OPERATION."

Control of Channel-Level Bidirectional Electron Tube Circuit(s) for Connecting or Disconnecting Reactive Impedance Element(s)

According to FIG. 1, channel-level bidirectional electron tube circuit 114, etc., may be operated by a Supervisory Control and Data Acquisition (SCADA) system 180 to connect or disconnect one or more reactive impedance element(s) 112, etc. between power conveying line 106 and ground to improve power factor in power conveying line 106. SCADA system 180 is responsive to a signal conditioner 182. Signal conditioner 182 may sense analog voltage and current on transducers 184 and 186, respectively, and digitize the sensed analog signals with analog-to-digital (A-D) converters (not shown). By using a digital computer such as a microprocessor (not shown) and software coding to implement algorithms to carry out functions described herein, signal conditioner 182 generates various digital signals, some or all of which are provided to SCADA system 180. For instance, signal conditioner 182 generates signals representing voltage, current, wattage, kilovolt-ampere (hereinafter, "kVA"), phase angle, power factor and VAR, by way of example. Implementing such software coding will be routine to persons of ordinary skill in the art based on the present specification.

Transducer 184 of FIG. 1 may be formed from what is known in the art as a "potential" transformer; and transducer 186 of FIG. 1 may be formed from what is known in the art as a "current" transformer. Signal conditioner 182 may be one of a class of signal conditioners that comprises a bank of A-D converters (not shown) for converting analog signals from transducers 184 and 186 into digital signals and providing the digital signals to a host microprocessor (or computer) and display (not shown). By way of examples, signal conditioner 182 may be (a) a Model EM132 Multi-Function Transducer sold by SATEC Inc. of Union, New Jersey, USA, or (b) a custom Programmable Logic Controller (PLC) programmed to implement similar functionality.

If desired, SCADA system 180 can provide instructions to signal conditioner 182, as indicated by a dashed-line arrow from SCADA system 180 to signal conditioner 182. This would be the case if separate signal conditioners and SCADA controllers were used.

In one exemplary embodiment of the invention, both SCADA system 180 and signal conditioner 182 are integrated into a control system 183 embodied as a single apparatus. Preferably, control system 183 automatically improves power factor in relation to desired setpoint for power factor. Control system 183 can provide power factor correction by creating the desired setpoint based on either true power factor that is based on true RMS calculations, including various harmonics, or power factor of the fundamental frequency of the AC power system. The preferred power factor setpoint is 1 (or 100%), although other, lower values can be chosen. Whenever the power factor is below the desired setpoint, control system 183 preferably automatically selects one or a combination of channel-level bidirectional electron tube circuit 114, etc., to operate so as to connect or disconnect one or more of reactive impedance element(s) 112, etc. between power conveying line 106 (FIG. 1) and ground. The selection of which reactive impedance element(s) to connect or disconnect at any given time will be routine to persons of ordinary skill in the art based on the present specification. For instance, it might be desirable for improving power factor to connect reactive impedance element(s) 112 and 122, and to disconnect reactive impedance element(s) 132 and 142, with reactive impedance element(s) 152 already having been disconnected, at any given time. Typically, reactive impedance element(s) will be connected or disconnected, as needed, to either add VARs to the AC power system 100 (FIG. 1) or to reduce reactive impedance in the system. Operation of the selected one or combination of channel-level bidirectional electron tube circuit 114, etc., preferably improves the power factor of AC power system 100 (FIG. 1) as close as possible to the desired setpoint.

The single setpoint for power factor referred to in the foregoing paragraph can be realized in a control system 183 that has a "low" setpoint value and a "high" setpoint value for power factor or reactive power. This can be done by making the "low" and "high" setpoints equal to or very slightly separated from each other.

Preferably, control system 183 has a software subroutine for initially bringing reactive impedance element(s) 112, etc., into a fully charged state before use of the power factor-improving system of FIG. 1. The software subroutine turns on channel-level bidirectional electron tube circuit 114, etc., in order to make sure that the reactive impedance element(s) are charged and ready for interposition between power conveying line 106 and ground. Similarly, should the resting charge state of reactive impedance element(s) 112, etc., drop below a predetermined level, control system 183 preferably will carry out a similar software subroutine for fully charging the reactive impedance element(s) 112, etc.

Control system 183 as described above is preferably implemented with a digital computer such as a microprocessor (not shown) and software coding to implement algorithms to carry out the above-described functions. The programming of such microprocessor will be routine to those of ordinary skill in the art in view of the present specification.

One possible example of control system 183 is a SATEC C192PF8-RPR Power Factor Manager & Reactive Power Regulator, available from SATEC Inc, of Union, N.J., USA. Descriptive literature for the foregoing SATEC apparatus was found at http://www.satec-global.com/UserFiles/satec/files/_C192PF8-RPR.pdf on Dec. 23, 2013, under the title "C192PF8-RPR Power Factor Manager & Reactive Power Regulator: Installation and Operation Manual," with the designation BG037 Rev. A1 under the title on the cover page. Such descriptive literature is incorporated herein in its entirety by reference.

One deficiency of using the SATEC apparatus mentioned in the foregoing paragraph relates to a presumption that an AC power system with power factor-improving capability uses mechanical switches, for instance, whose switching operations are limited in number. Thus, the descriptive literature for the SATEC apparatus cited in the foregoing paragraph refers to a highly (so-called) "optimized" operation mode for providing minimum switching operations. Such "optimized" operation is referred to as "so-called" herein, because it is a misnomer in the context of a preferred realization of the present invention, wherein the channel-level bidirectional electron tube circuits 114, etc. (FIG. 1) for reactive impedance element(s) 112, etc. (FIG. 1) are implemented as claimed. Thus, claim 1, appended to this specification, defines that "each of said channel-level bidirectional electron tube circuit compris[es] one bidirectional cold-cathode field-emission electron tube rated at medium to high voltage or two unidirectional cold-cathode field-emission electron tubes rated at medium to high voltage and connected in anti-parallel manner." As noted above, this type of electron tube may undergo connecting operations vastly more times than mechanical or semiconductor switches. As such, the present invention contemplates a different type of "optimization" wherein the channel-level bidirectional electron tube circuits 114, etc. are used to connect or disconnect reactive impedance element(as) 112, etc, as frequently as needed to improve power factor in AC power system 100 (FIG. 1) and lower the cost of electrical power consumption. The inventive optimization is not necessarily attained when using the subject SATEC apparatus.

The present invention is not limited to using the SATEC C192PF8-RPR apparatus identified two paragraphs above. In addition to referring to a single apparatus such as the foregoing SATEC apparatus, the term "control system" is intended to cover the combination of SCADA system 180 and signal conditioner 182, as well as their equivalents to either of the foregoing. Moreover, other ways to implement control system 183, with less reliance on the use of digital computers, will be obvious to persons of ordinary skill in the art based on the present specification. For instance, a control system may use analog circuits, such as electromagnetic relays, sensitive relays, or Schmidt triggers for carrying out the control system.

As mentioned above, the system for improving power factor shown in FIG. 1 is marked with $\Phi_1$ to indicate a first phase of a multi-phase system, but also shows in parenthesis $\Phi_2$ and $\Phi_3$, to indicate second and third phases of a multi-phase system. In one embodiment, each phase is independently controlled by a respective SCADA system, such as SCADA system 180, for instance. This recognizes the normal reality of independent VAR shifts on the three phases of a typical AC power conveying line. An alternative, less-expensive but less functional embodiment uses a single SCADA system to connect or disconnect the same value of reactive impedance in each of three phases.

When using channel-level or system-level current regulation in the presently described system for improving power factor in an AC power system, one of the advantages that arises is as follows: A controlled, gradual increase in conduction during the process of connecting a reactive impedance element(s) between power conveying line 106 (FIG. 1) and ground, when operating a bidirectional electron tube circuit in analog mode for current regulation. This reduces or eliminates the need for current-limiting energy-consuming devices, such as series inductors, known as "reactors" in the electric power industry, when connecting capacitive reactance between power conveying line 106 and ground to improve power factor, which avoids energy and heat losses for such eliminated series inductors.

The following is a list of reference numerals and associated parts as used in this specification and drawings:

| Reference Numeral | Part |
|---|---|
| 100 | AC power system |
| 102 | AC power source |
| 104 | Electrical load |
| 106 | Power conveying line |
| 108 | Power factor-improving circuit |
| 110 | Channel |
| 112 | Reactive impedance element(s) |
| 114 | Channel-level bidirectional electron tube circuit |
| 120 | Channel |
| 122 | Reactive impedance element(s) |

-continued

| Reference Numeral | Part |
|---|---|
| 124 | Channel-level bidirectional electron tube circuit |
| 130 | Channel |
| 132 | Reactive impedance element(s) |
| 134 | Channel-level bidirectional electron tube circuit |
| 140 | Channel |
| 142 | Reactive impedance element(s) |
| 144 | Channel-level bidirectional electron tube circuit |
| 150 | Channel |
| 152 | Reactive impedance element(s) |
| 154 | Channel-level bidirectional electron tube circuit |
| 180 | SCADA system |
| 182 | Signal conditioner |
| 183 | Control system |
| 184 | Transducer |
| 186 | Transducer |
| 190 | System-level voltage regulator |
| 196 | System-level current regulator |
| 197 | Power conveying line |
| 200 | Capacitor |
| 202 | Inductor |
| 204 | Capacitor |
| 206 | Inductor |
| 208 | Capacitor |
| 210 | Capacitor |
| 212 | Inductor |
| 214 | Inductor |
| 300 | Bidirectional electron tube circuit |
| 302 | Bidirectional electron tube |
| 304 | Cathanode |
| 305 | Grid |
| 306 | Cathanode |
| 307 | Grid |
| 400 | Bidirectional electron tube circuit |
| 405 | Unidirectional cold cathode field emission electron tube |
| 406 | Cathode |
| 407 | Anode |
| 408 | Grid |
| 410 | Unidirectional cold cathode field emission electron tube |
| 411 | Cathode |
| 412 | Anode |
| 413 | Grid |
| 415 | Node |
| 416 | Node |
| 500 | Channel |
| 502 | Channel-level bidirectional electron tube circuit |
| 504 | Reactive impedance element(s) |
| 600 | Current-regulating electron tube |
| 602 | Bias resistor |
| 604 | Bias resistor |
| 610 | PFN |
| 612 | Resistor |
| 614 | Capacitor |
| 616 | Resistor |
| 618 | Capacitor |
| 620 | Resistor |
| 622 | Capacitor |
| 630 | PFN |
| 632 | Resistor |
| 634 | Capacitor |
| 636 | Resistor |
| 638 | Capacitor |
| 640 | Resistor |
| 642 | Capacitor |
| 650 | Graph |
| 652 | Spike |
| 655 | Envelope |
| 657 | Bypass capacitor |
| 660 | Graph |
| 662 | Envelope |
| 700 | System-level voltage regulator |
| 702 | Bidirectional cold cathode field emission electron tube |
| 704 | Cathanode |
| 706 | Cathanode |
| 708 | Control grid |
| 709 | Control grid |
| 710 | Resistor |

-continued

| Reference Numeral | Part |
|---|---|
| 712 | Resistor |
| 714 | Resistor |
| 716 | Resistor |

While the invention has been described with respect to preferred embodiments by way of illustration, many modifications and changes will be routine to those skilled in the art. For instance, although two different types of channel-level or system-level current regulators have been described in detail herein, selection of many other topologies of suitable current regulators will be routine to persons of ordinary skill in the art based on the present specification. Therefore, the scope of the appended claims should not be limited by such preferred embodiments and examples described herein, but should be given the broadest interpretation consistent with the description as a whole. The original appended claims are incorporated by reference in this description.

What is claimed is:

1. In combination with an AC power system having an AC power source and an electrical load that are interconnected by at least one power conveying line for conveying power from said AC power source to said electrical load, a system for improving power factor of the AC power system by continuously variable, analog control of level of reactive current introduced into said power conveying line, comprising:

a) a power factor-improving circuit including at least one channel that comprises a channel-level AC electron tube circuit and at least one associated reactive impedance element interconnected in series manner; said AC electron tube circuit and said at least one associated reactive impedance element being coupled between said power conveying line of the AC power system and ground;

b) each of said channel-level AC electron tube circuit being responsive to a control system for continuously variable, analog control of the level of reactive current in the at least one associated reactive impedance element so that the foregoing level of reactive current changes, as necessary, in a continuously variable, analog manner to improve power factor in said power conveying line; and c) each of said channel-level AC electron tube circuit comprising one AC cold-cathode field-emission electron tube rated at medium to high voltage or two unidirectional cold-cathode field-emission electron tubes rated at medium to high voltage and connected in anti-parallel manner.

2. The system of claim 1, wherein the at least one associated reactive impedance element comprises either one capacitor or more than one capacitor connected in parallel, which are associated with said channel-level AC electron tube circuit.

3. The system of claim 1, wherein the at least one associated reactive impedance element comprises one or more inductors, each of which is associated with said channel-level AC electron tube circuit.

4. The system of claim 1, wherein the at least one associated reactive impedance element comprises a set of one or more capacitors and one or more inductors, each set of which is associated with said channel-level AC electron tube circuit.

5. The system of claim 1, wherein:
a) each of said channel-level AC electron tube circuit and the at least one associated reactive impedance element comprises at least first, second, third, fourth and fifth channel-level AC electron tube circuits and a respective at least one reactive impedance element associated with each channel-level AC electron tube circuit;
b) each of the respective at least one reactive impedance element associated with the first and second channel-level AC electron tube circuits has a value of approximately a base reactance value, the respective at least one reactive impedance element associated with the third channel-level AC electron tube circuit has a reactance value of approximately twice said base value, the respective at least one reactive impedance element associated with the fourth channel-level AC electron tube circuit has a reactance value of approximately five times said base value, and the respective at least one reactive impedance element associated with the fifth channel-level AC electron tube circuit has a reactance value of approximately ten times said base value.

6. The system of claim 1, wherein one or more of each of said channel-level AC electron tube circuit is provided with a respective pair of control terminal-controlled current-limiter circuits for limiting current therein in a continuously variable, analog manner to a fixed maximum value for preventing undesirably high current from being introduced into said power conveying line during process of controlling the level of reactive current in the at least one associated reactive impedance element.

7. The system of claim 6, wherein the respective pair of control terminal-controlled current limiter circuits for limiting current in a continuously variable, analog manner to a fixed maximum value comprises a pair of grid-controlled current-limiter circuits for limiting current in a continuously variable, analog manner to a fixed maximum value.

8. The system of claim 1, wherein one or more of each of said channel-level AC electron tube circuit are adapted to each operate as a component of a respective channel-level current regulator for controlling the level of reactive current in the at least one associated reactive impedance element in a dynamically adjustable, continuously variable, control terminal-controlled, analog manner; said respective channel-level current regulator being adapted to prevent undesirably high current from being introduced into said power conveying line during process of controlling the level of reactive current in the at least one associated reactive impedance element.

9. The system of claim 1, wherein:
a) a system-level current regulator is serially connected in said power conveying line between said power factor-improving circuit and said electrical load;
b) the system-level current regulator being adapted to prevent undesirably high current from being introduced into said power conveying line during process of controlling the level of reactive current in each of at least one associated reactive impedance element.

10. The system of claim 9, wherein:
a) the system-level current regulator comprises a system-level AC electron tube circuit formed of one AC cold-cathode field-emission electron tube rated at medium to high voltage or two unidirectional cold-cathode field-emission electron tubes rated at medium to high voltage and connected in anti-parallel manner;
b) said system-level AC electron tube circuit is adapted to operate in analog manner and is located in a main current path through the system-level current regulator.

11. The system of claim 10, wherein said system level AC electron tube circuit is adapted to operate in analog manner and is provided with a respective pair of grid-controlled current-limiter circuits for limiting current in a continuously variable, analog manner therein to a fixed maximum value for preventing undesirably high current from being introduced into said power conveying line during process of controlling the level of reactive current in each of the at least one associated reactive impedance element.

12. The system of claim 10, wherein said system-level AC electron tube circuit is adapted to operate in analog manner and to function as a current regulator for increasing or decreasing current in said power conveying line in a dynamically adjustable, continuously variable, grid-controlled, analog manner for preventing undesirably high current from being introduced into said power conveying line during process of controlling the level of reactive current in each of the at least one associated reactive impedance element.

13. The system of claim 9, wherein:
a) the system-level current regulator comprises a system-level AC circuit with controlled current conduction rated at medium to high voltage; and
b) said system-level AC electron circuit with controlled current conduction is adapted to operate in analog manner and is located in a main current path through the system-level current regulator.

14. The system of claim 1, wherein a system-level voltage regulator is serially connected in said power conveying line between said power factor-improving circuit and the electrical load to protect the load from overvoltage that may arise when approaching a matching point between impedance of the AC power source and impedance of the electrical load while operating said power factor-improving circuit.

15. The system of claim 14, wherein the system-level voltage regulator includes a cold cathode field emission electron tube as an active voltage-regulation element.

16. The system of claim 14, wherein:
a) a system-level current regulator is serially connected in said power conveying line between said power factor-improving circuit and the system-level voltage regulator;
b) the system-level current regulator being adapted to prevent undesirably high current from being introduced into said power conveying line during process of controlling the level of reactive current in each of at least one associated reactive impedance element.

17. The system of claim 16, wherein:
a) the system-level current regulator comprises a system-level AC electron tube circuit formed of one AC cold-cathode field-emission electron tube rated at medium to high voltage or two unidirectional cold-cathode field-emission electron tubes rated at medium to high voltage and connected in anti-parallel manner;
b) said system-level AC electron tube circuit is adapted to operate in analog manner and is located in a main current path through the system-level current regulator.

18. The system of claim 17, wherein said system-level AC electron tube circuit is provided with a respective pair of grid-controlled current-limiter circuits for limiting current in a continuously variable, analog manner therein to a fixed maximum value for preventing undesirably high current from being introduced into said power conveying line during process of controlling the level of reactive current in each of the at least one associated reactive impedance element.

19. The system of claim 17, wherein said system-level AC electron tube circuit is adapted to function as a current regulator for increasing or decreasing current in a dynamically adjustable, continuously variable, grid-controlled, analog manner for preventing undesirably high current from being introduced into said power conveying line during process of controlling the level of reactive current in each of the at least one associated reactive impedance element.

20. The system of claim 16, wherein:
a) the system-level current regulator comprises a system-level AC circuit with controlled current conduction rated at medium to high voltage; and
b) said system-level AC circuit with controlled current conduction is adapted to operate in analog manner and is located in a main current path through the system-level current regulator.

21. The system of claim 1, wherein:
a) the AC power system has three power conveying lines, each with a different phase; and
b) each power conveying line is associated with a respective power-factor improving circuit having the features of said power-factor-improving circuit as defined above.

22. The system of claim 1, wherein each of said channel-level AC electron tube circuit has a standoff voltage exceeding a nominal operating voltage of said power conveying line, whereby respective circuit elements connecting said at least one associated reactive impedance element between said power conveying line and ground are free of a ferrous-core electrical transformer.

23. In combination with an AC power system having an AC power source and an electrical load that are interconnected by at least one power conveying line for conveying power from said AC power source to said electrical load, a system for improving power factor of the AC power system by continuously variable, analog control of level of reactive current introduced into said power conveying line, comprising:
a) a power factor-improving circuit including at least one channel that comprises a channel-level AC circuit with controlled current conduction and at least one associated reactive impedance element interconnected in series manner; said AC circuit with controlled current conduction and said at least one associated reactive impedance element being coupled between said power conveying line of the AC power system and ground; and
b) each of said channel level AC circuit with controlled current conduction being responsive to a control system for continuously variable, analog control of the level of reactive current in the at least one associated reactive impedance element so that the foregoing level of reactive current changes, as necessary, in a continuously variable, analog manner to improve power factor in said power conveying line;
c) one or more of each of said channel-level AC circuit with controlled current conduction being adapted to each operate as a component of a respective channel-level current regulator for controlling the level of reactive current in a continuously variable, analog manner; said respective channel-level current regulator being adapted to prevent undesirably high current from being introduced into said power conveying line during process of controlling the level of reactive current in each of at least one associated reactive impedance element.

24. The system of claim 23, wherein one or more of each of said channel-level AC circuit with controlled conduction includes a respective pair of control terminal-controlled current-limiter circuits for limiting current therein in a continuously variable manner to a fixed maximum value for preventing undesirably high current from being introduced into said power conveying line during process of controlling the level of reactive current in the at least one associated reactive impedance element.

25. The system of claim 23, wherein one or more of each of said channel-level AC circuits with controlled conduction is each adapted to operate as a component of a respective channel-level current regulator for controlling the level of reactive current in the at least one associated reactive impedance element in a dynamically adjustable, continuously variable, controlled manner.

26. In combination with an AC power system having an AC power source and an electrical load that are interconnected by at least one power conveying line for conveying power from said AC power source to said electrical load, a system for improving power factor of the AC power system by continuously variable, analog control of level of reactive current introduced into said power conveying line, comprising:
a) a power factor-improving circuit including at least one channel that comprises a channel-level AC circuit with controlled current conduction and at least one associated reactive impedance element interconnected in series manner; said AC circuit and said at least one associated reactive impedance element being coupled between said power conveying line of the AC power system and ground;
b) each of said channel-level AC circuit with controlled current conduction being responsive to a control system for continuously variable, analog control of the level of reactive current in the at least one associated reactive impedance element so that the foregoing level of reactive current changes, as necessary, in a continuously variable analog manner to improve power factor in said power conveying line; and
c) a system-level current regulator serially connected in said power conveying line between said power factor-improving circuit and the electrical load; said system-level current regulator comprising a system-level AC circuit with controlled current conduction that is adapted to operate in analog manner and to control current therethrough in a continuously variable, analog manner and that is located in a main current path through the system-level current regulator; the system-level current regulator being adapted to prevent undesirably high current from being introduced into said power conveying line during process of controlling the level of reactive current in each of at least one associated reactive impedance element.

27. The system of claim 26, wherein said system-level AC circuit with controlled current conduction is provided with a respective pair of control terminal-controlled current-limiter circuits for limiting current therein in a continuously variable, analog manner to a fixed maximum value for preventing undesirably high current from being introduced into said power conveying line during process of controlling the level of reactive current in the at least one associated reactive impedance element between said power conveying line and ground.

28. The system of claim 26, wherein said system-level AC circuit with controlled current conduction is adapted to adjust current therethrough in a way that increases or decreases the foregoing current in a dynamically adjustable, continuously variable, analog manner.

29. In combination with an AC power system having an AC power source and an electrical load that are interconnected by at least one power conveying line for conveying power from said AC power source to said electrical load, a system for improving power factor of the AC power system by continuously variable, analog control of level of reactive current introduced into said power conveying line, comprising:

a power factor-improving circuit including at least one channel that comprises a channel-level AC circuit with controlled current conduction and at least one associated reactive impedance element interconnected in series manner; said AC circuit with controlled current conduction and said at least one associated reactive impedance element being coupled between said power conveying line of the AC power system and ground;

b) each of said channel-level AC circuit with controlled current conduction being responsive to a control system for continuously variable, analog control of the level of reactive current in the at least one associated reactive impedance element so that the foregoing level of reactive current changes, as necessary, in a continuously variable analog manner to improve power factor in said power conveying line; and c) a system-level voltage regulator serially connected in said power conveying line between said power factor-improving circuit and the electrical load to protect the load from overvoltage that may arise when approaching a matching point between impedance of the AC power source and impedance of the electrical load while operating said power factor-improving circuit; the system-level voltage regulator including a system-level AC circuit with controlled current conduction that is adapted to operate in analog manner and to control current therethrough in a continuously variable manner and that is used as an active voltage-regulation element.

\* \* \* \* \*